US008843761B2

(12) United States Patent
Meyer et al.

(10) Patent No.: US 8,843,761 B2
(45) Date of Patent: Sep. 23, 2014

(54) METHOD AND APPARATUS FOR PROTECTION OF A PROGRAM AGAINST MONITORING FLOW MANIPULATION AND AGAINST INCORRECT PROGRAM RUNNING

(75) Inventors: Bernd Meyer, München (DE); Marcus Schafheutle, München (DE); Hermann Seuschek, München (DE)

(73) Assignee: Siemens Aktiengesellschaft, Munich (DE)

( * ) Notice: Subject to any disclaimer, the term of this patent is extended or adjusted under 35 U.S.C. 154(b) by 370 days.

(21) Appl. No.: 12/733,178

(22) PCT Filed: Jul. 10, 2008

(86) PCT No.: PCT/EP2008/058980
§ 371 (c)(1),
(2), (4) Date: Feb. 16, 2010

(87) PCT Pub. No.: WO2009/021789
PCT Pub. Date: Feb. 19, 2009

(65) Prior Publication Data
US 2010/0146624 A1    Jun. 10, 2010

(30) Foreign Application Priority Data
Aug. 16, 2007    (DE) .................. 10 2007 038 763

(51) Int. Cl.
*G06F 21/12*        (2013.01)
*G06F 21/54*        (2013.01)
*G06F 11/28*        (2006.01)
*G06F 21/55*        (2013.01)

(52) U.S. Cl.
CPC .............. *G06F 11/28* (2013.01); *G06F 21/552* (2013.01); *G06F 21/54* (2013.01)
USPC ......................................................... 713/187

(58) Field of Classification Search
CPC ........ G06F 21/54; G06F 11/28; G06F 21/552
USPC ....................................... 726/22, 23; 713/187
See application file for complete search history.

(56) References Cited

U.S. PATENT DOCUMENTS

| 4,108,359 A | 8/1978 | Proto |
| 4,261,041 A * | 4/1981 | Starr ............................ 702/98 |

(Continued)

FOREIGN PATENT DOCUMENTS

| DE | 693 12 457 T2 | 7/1994 |
| EP | 1 056 012 A2 | 11/2000 |

(Continued)

OTHER PUBLICATIONS

Strumpen et al "Portable Checkpointing for Heterogeneous Architecture", 1997.*

(Continued)

*Primary Examiner* — Jung Kim
*Assistant Examiner* — Shan Elahi
(74) *Attorney, Agent, or Firm* — Staas & Halsey LLP

(57) ABSTRACT

Protection program commands are inserted into at least one program command sequence of program commands in a program, to produce and check a monitoring flow marking sequence.

14 Claims, 5 Drawing Sheets

(56) References Cited

U.S. PATENT DOCUMENTS

| | | | |
|---|---|---|---|
| 5,402,492 A * | 3/1995 | Goodman et al. | 726/20 |
| 5,581,763 A * | 12/1996 | Hait | 726/23 |
| 5,649,203 A * | 7/1997 | Sites | 717/156 |
| 5,974,529 A | 10/1999 | Zumkehr et al. | |
| 6,026,235 A * | 2/2000 | Shaughnessy | 717/127 |
| 6,643,775 B1 * | 11/2003 | Granger et al. | 713/190 |
| 6,704,309 B1 * | 3/2004 | Nada et al. | 370/389 |
| 7,168,065 B1 * | 1/2007 | Naccache et al. | 717/127 |
| 7,320,013 B2 * | 1/2008 | Mukund et al. | 708/209 |
| 7,383,443 B2 * | 6/2008 | Zeman et al. | 713/190 |
| 7,406,712 B2 * | 7/2008 | Kondo | 726/23 |
| 7,844,954 B2 * | 11/2010 | Venkitachalam et al. | 717/130 |
| 7,882,396 B2 * | 2/2011 | Bolignano et al. | 714/37 |
| 8,095,993 B2 * | 1/2012 | Shu et al. | 726/34 |
| 8,195,953 B1 * | 6/2012 | Yue et al. | 713/187 |
| 8,302,188 B2 * | 10/2012 | Sato et al. | 726/22 |
| 2003/0223417 A1 * | 12/2003 | Higashida | 370/389 |
| 2004/0003264 A1 * | 1/2004 | Zeman et al. | 713/190 |
| 2004/0068541 A1 * | 4/2004 | Bayassi et al. | 709/204 |
| 2004/0210610 A1 * | 10/2004 | Mukund et al. | 708/209 |
| 2005/0273850 A1 * | 12/2005 | Freund | 726/14 |
| 2006/0095381 A1 * | 5/2006 | Yokota et al. | 705/57 |
| 2006/0282741 A1 | 12/2006 | Akkar et al. | |
| 2007/0174750 A1 * | 7/2007 | Borin | 714/732 |
| 2008/0222441 A1 * | 9/2008 | Olofsson | 713/400 |
| 2008/0279562 A1 * | 11/2008 | Naoe et al. | 398/140 |

FOREIGN PATENT DOCUMENTS

| | | |
|---|---|---|
| FR | 2 841 015 A1 | 12/2003 |
| WO | 00/54155 | 9/2000 |
| WO | 01/97010 A2 | 12/2001 |
| WO | 03/042547 A2 | 5/2003 |
| WO | 2005/073859 A2 | 8/2005 |

OTHER PUBLICATIONS

Volker Strumpen et al, "Compiler Technology for Portable Checkpoints", DARPA Grant N00014-94-0985.*

Strumpen et al, Portable Checkpointing for Heterogeneous Architectures, 1997.*

Office Action dated Dec. 16, 2008 for German Patent Application 10 2007 038 763.8.

Office Action dated Jan. 29, 2008 for German Patent Application 10 2007 038 763.8.

International Search Report for PCT/EP2008/058980; mailed Oct. 22, 2008.

Office Action dated Jun. 2, 2014 in corresponding European Patent Application No. 08774957.8.

* cited by examiner

Reference control flow flag sequence: $\underline{AB}\ \underline{AB}\ \underline{AB}\ \underline{AB}\ \underline{AB}\ C$
$\ \ \ \ \ \ \ \ \ \ \ \ \ \ \ \ \ \ \ \ \ \ \ \ \ \ \ \ \ \ \ \ \ i=1\ \ i=2\ \ i=3\ \ i=4\ \ i=5$ Control flow flag sequence for error F1: $\underline{AB}\ \underline{AB}\ \underline{AB}\ C$
$\ \ \ \ \ \ \ \ \ \ \ \ \ \ \ \ \ \ \ \ \ \ \ \ \ \ \ \ \ \ \ \ \ \ \ \ \ \ i=1\ \ i=2\ \ i=3$

METHOD AND APPARATUS FOR PROTECTION OF A PROGRAM AGAINST MONITORING FLOW MANIPULATION AND AGAINST INCORRECT PROGRAM RUNNING

CROSS REFERENCE TO RELATED APPLICATIONS

This application is the U.S. national stage of International Application No. PCT/EP2008/058980, filed Jul. 10, 2008 and claims the benefit thereof. The International Application claims the benefit of German Application No. 10 2007 038 763.8 filed on Aug. 16, 2007, both applications are incorporated by reference herein in their entirety.

BACKGROUND

1. Field

The invention relates to a method and an apparatus for protecting a program against control flow manipulation and is used to detect an incorrect program flow.

2. Description of the Related Art

In safety-critical program applications, which operate on any desired hardware, there is the risk of an attacker trying to use external influences to deliberately interfere with the hardware that executes the program application and hence alter the normal program flow. A variation of the program flow in a cryptographic process may be sufficient to extract codes, which under normal conditions are stored securely in hardware, and hence compromise a cryptographic system.

FIG. 1 is used to illustrate the underlying problem.

FIG. 1 shows a flowchart for entering a password in a known data processing system. First, a user is prompted to enter a password. After the password has been entered, the password is checked for its correctness by the data processing system. If the password is correct, access to the resources of the data processing system is granted. If the password is incorrect, access to the data is denied.

The program represented as a flowchart in FIG. 1 is executed for example in a processor for processing program commands, which are written in any desired programming language. In the event of an attack on the hardware platform and/or the processor, at the time of processing the program command to check the password an attacker may manage to manipulate the program flow of the program in such a way that, despite entry of an incorrect password, access to the data is granted by the data processing unit, i.e. the program flow branches incorrectly.

For example, by laser flashes an attacker may deliberately temporally and spatially interfere with the processing of individual instructions and/or program commands in such a way that a control flow of the executed program is altered. In this case, for example individual jump instructions or calls of subroutines may be stopped.

A further possible attack is to bring about changes of calculated intermediate results.

SUMMARY

An aspect is therefore to provide a method and an apparatus for protecting a program against control flow manipulation and for detecting an incorrect program flow.

Described below is a method of protecting the program against control flow manipulation, wherein protect program commands for generating and checking a control flow flag sequence are inserted into at least one program command sequence of program commands of the program.

In an embodiment of the method, a control flow flag of the control flow flag sequence is formed by a number, a random number, a count value, a command opcode of a program command, a command address of a program command, an operand of a program command or by a count value of a program command counter.

In an embodiment of the method, a protect program command or a protect program command sequence calculates a check value as a function of the control flow flag sequence.

In an embodiment of the method, the check value is formed over a part of constant length of the control flow flag sequence generated up to this instant.

In an alternative embodiment of the method, the check value is formed over the entire control flow flag sequence generated up to this instant.

In an embodiment of the method, the check value is formed by a hash value.

In an embodiment of the method, a protect program command or a protect program command sequence compares the calculated check value with a reference value of a reference control flow flag sequence or checks whether the calculated check value is contained in a set of reference values.

In an embodiment of the method, the reference value is formed by a reference-value hash value.

Also described below is an apparatus for protecting a program against control flow manipulation, wherein protect program commands for generating and checking a control flow flag sequence are automatically inserted into at least one program command sequence of program commands of the program.

Described below is a method of detecting an incorrect program flow of a program by
  generating a control flow flag sequence during a program flow of the program, and
  detecting an incorrect program flow if the generated control flow flag sequence does not match a stored reference control flow flag sequence or if the generated control flow flag sequence is not contained in a set of stored reference control flow flag sequences.

In an embodiment of the method of detecting an incorrect program flow, the control flow flag sequence includes control flow flags that are formed in each case by a number, a random number, a count value, a command opcode, a command address, an operand or by a command count value of the program command counter.

In an embodiment of the method, the incorrect program flow is detected if the calculated check value does not match a calculated reference value or if the calculated check value is not contained in a set of calculated reference values.

Also described below is an apparatus for detecting an incorrect program flow of a program by providing
  a device for generating a control flow flag sequence during a program flow of the program and
  a device for detecting an incorrect program flow of the program if the generated control flow flag sequence does not match a stored reference control flow flag sequence or if the generated control flow flag sequence is not contained in a set of stored reference flow control flow flag sequences.

Also described below is a computer program, which may be stored on a physical medium, such as a computer memory device, for protecting against control flow manipulation has inserted protect program commands that are provided for generating and checking a control flow flag sequence.

In an embodiment of the computer program, the control flow flags of a control flow flag sequence are formed in each case by a number, a random number, a count value, a command opcode, a command address, an operand or by a command count value.

Also described below is a data carrier for storing a computer program for protecting against control flow manipulation has inserted protect program commands that are provided for generating and checking a control flow flag sequence.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
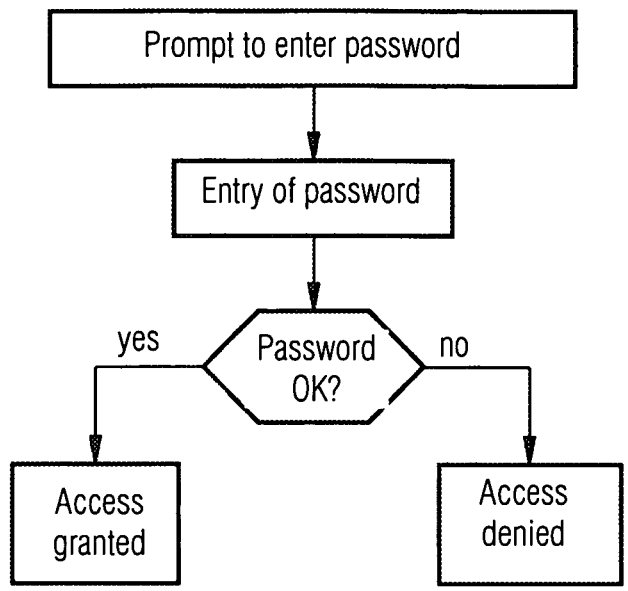
FIG. 1 is a flowchart illustrating the underlying problem.

Reference will now be made in detail to the preferred embodiments, examples of which are illustrated in the accompanying drawings, wherein like reference numerals refer to like elements throughout.

Figure 2:
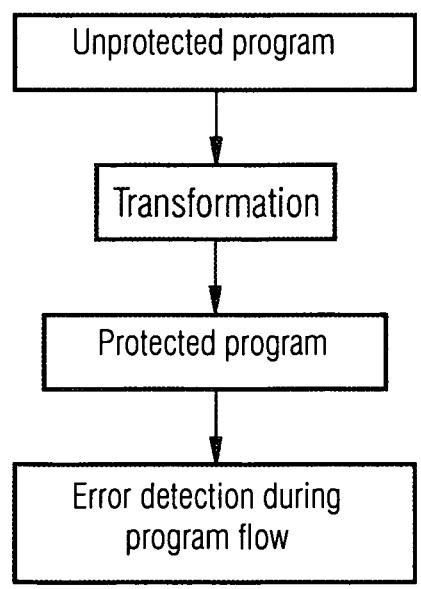
FIG. 2 is a flowchart representing a possible procedure for protecting the program against control flow manipulation and for detecting an incorrect program flow.

FIG. 2 shows the basic procedure in the method of protecting a program against control flow manipulation and of detecting an incorrect program flow of the program.

First, an unprotected program is read in. The program contains a plurality of program commands, which are executed in accordance with a control flow by hardware. This hardware may include, for example, a microprocessor. The control flow of the program also has, in addition to sequential program parts that are to be processed, program branches.

Figure 3:
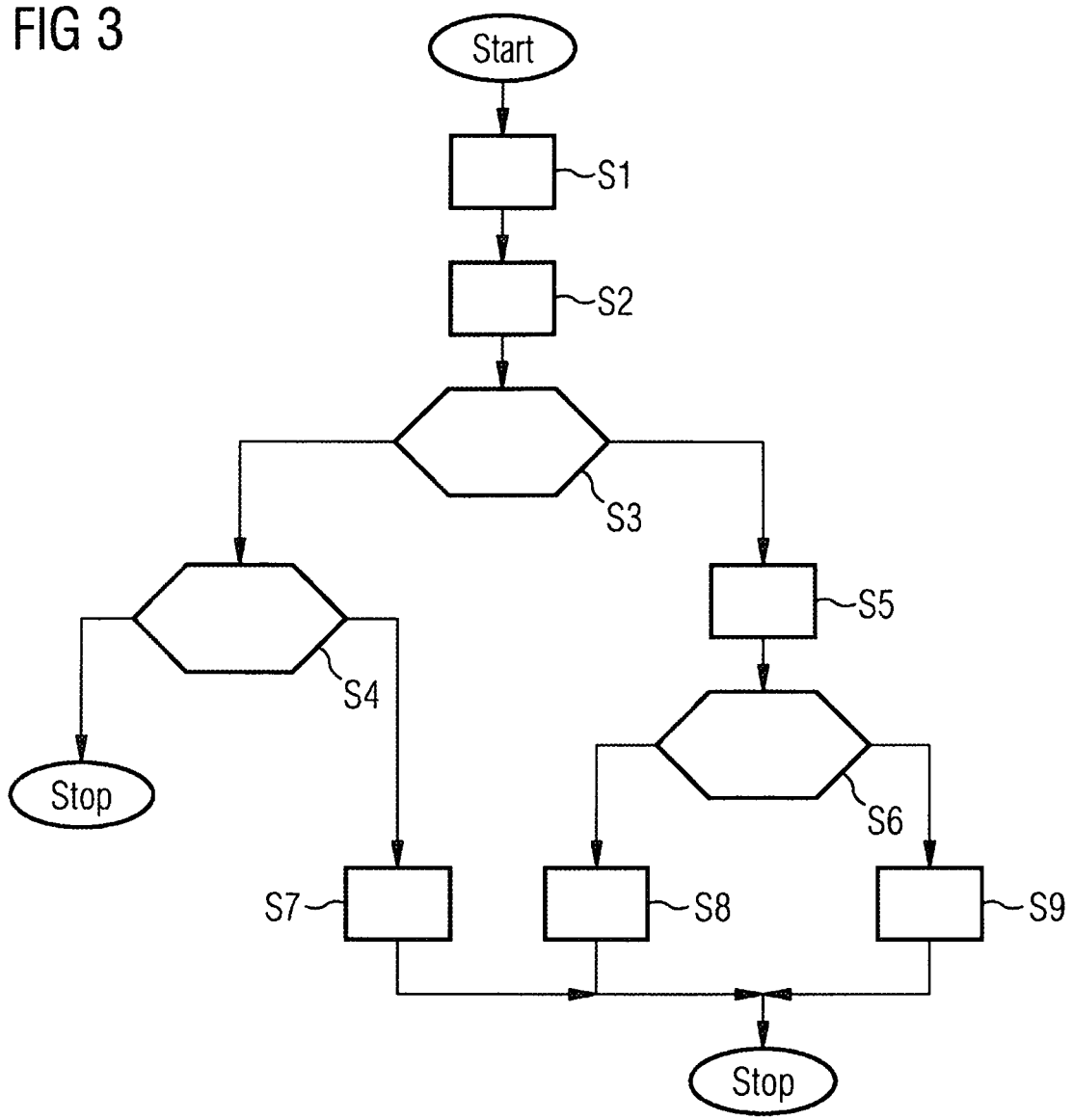
FIG. 3 is an example of a control flow of a program that is to be protected.
Figure 4:
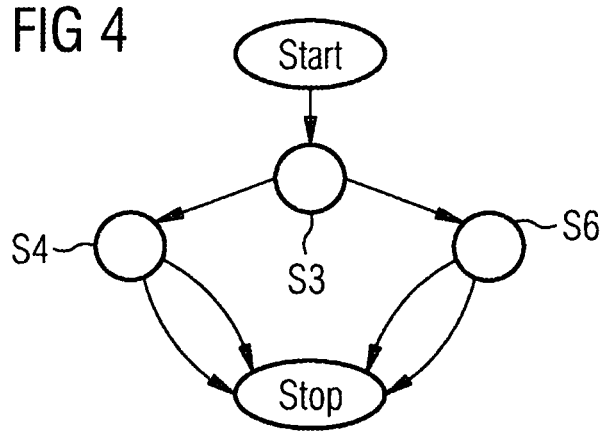
FIG. 4 is a control flow graph for the program represented by way of example in FIG. 3.

FIG. 3 shows a flowchart of an example of a computer program that has a plurality of program steps S1-S9. Each of the program steps S1-S9 represented in FIG. 3 has one or more program commands to be executed. FIG. 4 represents a control flow graph associated with the flowchart represented in FIG. 3. As may be seen from FIGS. 3,4, the represented example of a program has a plurality of program branches S3, S4, S6. The control flow of the program according to FIG. 3 is represented in FIG. 4 as a directional graph. The computer program contains program parts that are to be executed sequentially, which are represented as edges of the graph, and nodes representing program branches. A specific execution of a program can therefore be represented as a path within the control flow graph. After execution of the program the method allows determination of the path, which the program has run through during its execution.

To make this possible, as is represented in FIG. 2 the original unprotected computer program is first transformed into a protected program. In this case, in order to protect the program against control flow manipulation the unprotected program is transformed by inserting protect program commands for generating and checking a control flow flag sequence into at least one program command sequence of program commands PB of the unprotected program.

For determining an execution path of the program, check points and/or control flow flags are therefore inserted into the sequentially executed program parts, which correspond to the edges of the control flow graph. In this case, in an embodiment at least one check point and/or control flow flag is inserted into each sequentially executed program part.

An inserted control flow flag may be a number, a random number, a count value, a command opcode of a program command, a command address of a program command, an operand of a program command or a count value of a program command counter. The inserted check points and/or flags may be for example simply numbered consecutively. Furthermore, as a flag the address of the instructions actually inserted at the check points may be used. It is further possible to use the executed program commands and/or instructions themselves or their operands as flags. It is moreover possible for flags to be randomly generated during development of the program.

In an embodiment of the method of protecting a program against control flow manipulation, a protect program command, which is inserted into the original program command sequence of the program, or a protect program command sequence calculates a check value as a function of the control flow flag sequence. In this case, at each check point the calculation of a check value is carried out, the calculation being dependent upon at least one flag of a preceding check point. The calculated check value may be formed for example by a hash value.

In an embodiment of the method, the check value is formed for the entire control flow flag sequence generated up to this instant.

In an alternative embodiment of the method of protecting a program against control flow manipulation, the check value is formed over a part of constant length of the control flow flag sequence generated up to this instant.

In an embodiment of the method of protecting a program against control flow manipulation, an inserted protect program command or a protect program command sequence compares the calculated check value, which includes for example a hash value, with a reference value of a reference control flow flag sequence. If the calculated check value and the reference value match, then it is highly probable that the execution path of the computer program of a program part was run through in the correct order. If the calculated check value and the reference value do not match, it is highly probable that an error in the execution of the program exists.

In a possible embodiment of the method of protecting a program against control flow manipulation, a protect program command or a protect program command sequence checks whether the calculated check value is contained in a set of defined reference values. These reference values may be for example reference hash values.

Depending on the method used to calculate the check value, part of the execution path of the program may be locally verified.

In an embodiment of the method, the calculated check value is a function of a fixed number of test points that have been run through immediately beforehand.

In an alternative embodiment of the method, the check value is a function of the flags of the entire execution path that has been run through up until then. If the entire previous execution path of a program is checked, this offers the advantage that a verification of the control flow in an application is spread over many test points. Thus, it is highly probable that attacks, which attempt with the aid of precisely adjusted attacks to bypass individual comparisons of check- and reference values, will also be detected at another test point.

As a result of the program being protected by inserting protect program commands S-PB, it is possible during running of a program to detect a manipulation of the program control flow.

For this purpose, during execution of the protected computer program containing the inserted protect program commands a control flow flag sequence is generated during the program flow.

An incorrect program flow is detected if the control flow flag sequence thus generated does not match a stored reference control flow flag sequence or if the generated control flow flag sequence is not contained in a set of previously stored reference control flow flag sequences.

Figure 5:
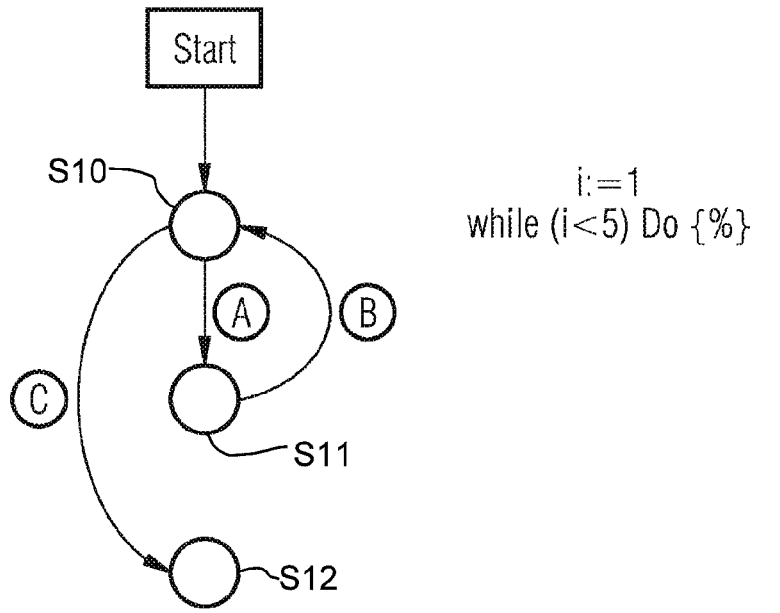
FIG. 5 is an example of generation of a reference control flow flag sequence according to an embodiment of the method.

FIG. 5 shows a control flow graph of a simple computer program in order to explain the method. The computer program may be a simple loop. As long as a count value i<5, a specific calculation is carried out. The edges of the control flow graph represent a program part that is to be executed sequentially and the nodes correspond to program branches.

Normally, in the absence of manipulation the edges A, B, C are processed with the associated following reference control flow flag sequence: AB AB AB AB AB C.

This means that the loop, which has the edges AB, is run through five times and then there is a jump via the edge C to the end of the program. Each program and/or program part has a determinable reference control flow flag sequence, which represents the correct program flow.

Figure 6:
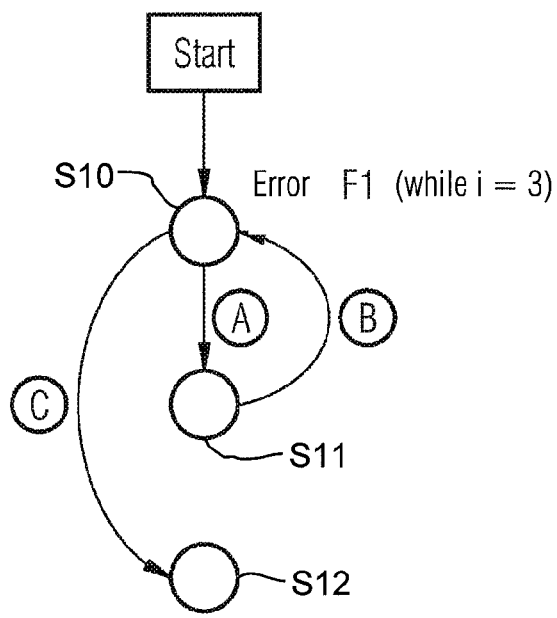
FIG. 6 is an example of a control flow flag sequence in the event of an error in order to explain the mode of operation of the method.

FIG. 6 shows a control flow flag sequence in the event of an error F1 occurring during a third run through the program loop represented in FIG. 5.

The control flow flag sequence upon occurrence of the error F1 is: AB AB AB C.

Figure 7:
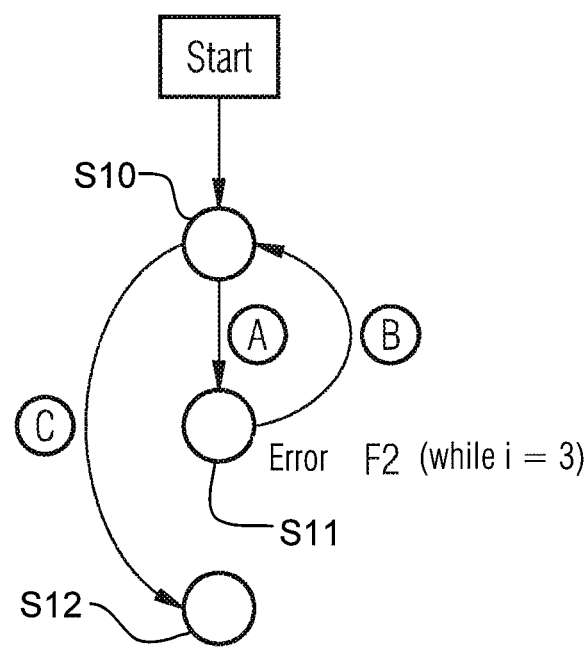
FIG. 7 is a further example of a control flow flag sequence in the event of an error in order to explain the mode of operation of the method.

FIG. 7 shows a control flow flag sequence in the event of an error F2 occurring at the end of the loop in the third iteration. The control flow flag sequence upon occurrence of the error F2 is: AB ABA.

As is evident from the examples in FIGS. 6, 7 each error F occurring at a program branch of a computer program has a typical or characteristic control flow flag sequence that differs from the reference control flow flag sequence of the correctly running program.

For error detection, therefore, in the method protect program commands S-PB are inserted into the program code of the original computer program.

Figure 8:
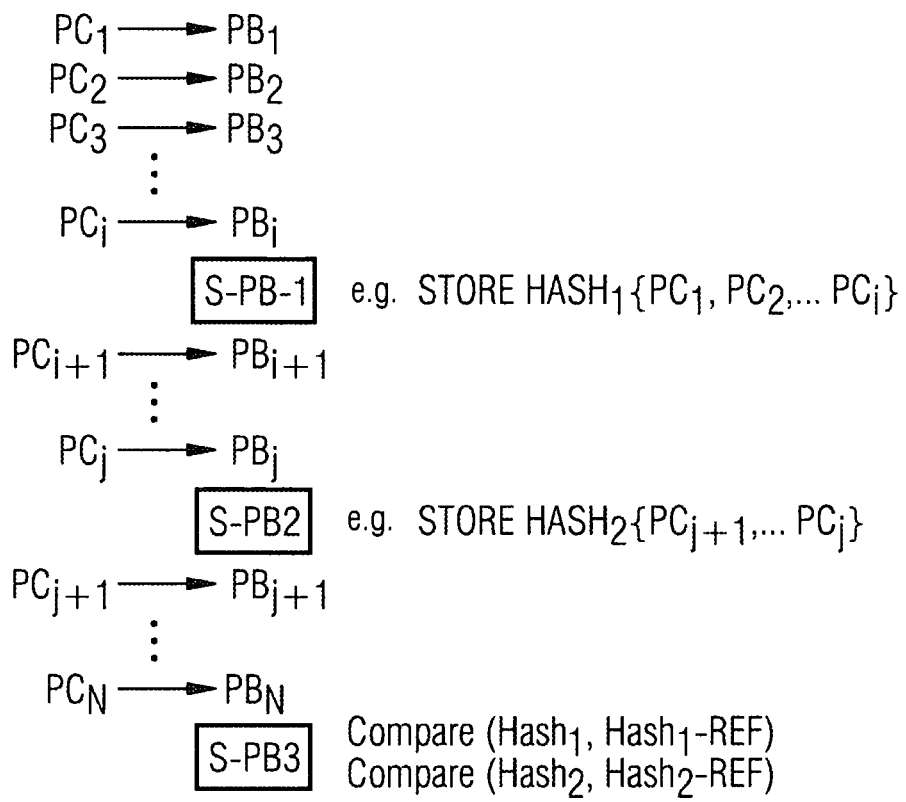
FIG. 8 is a code listing in order to illustrate a computer program protected in accordance with the method.

FIG. 8 diagrammatically shows a computer program, which is protected by protect program commands S-PB against control flow manipulation. A program counter PC indicates the program commands PB that are to be executed. At test points the protect program commands are inserted into the program flow. The protect program commands S-PB calculate for example a check value as a function of a control flow flag sequence. In the example represented in FIG. 8, the protect program command S-PB-1 calculates a hash value as a check value as a function of a control flow flag sequence, which includes a set of control flow flags. In the example represented in FIG. 8, the control flow flags includes the program command count values of the program command counter and/or of the program counter PC of the preceding program commands PC1 to PCi.

\At a further test point a further protect program command S-PB2 is provided, which likewise calculates a hash value as a check value as a function of control flow flags. The control flow flags for this second protect program command S-PB2 are formed likewise by program command count values PC of preceding program commands.

\A further protect program command S-PB3 compares the check value determined by the first protect program command S-PB1 and stored, i.e. the hash value HASH1, with a reference value HASH1-REF. The third protect program command S-PB3 further compares the check value HASH2 calculated by the second protect program command S-PB2 with a reference value HASH2-REF.

\In the exemplary embodiment represented in FIG. 8, the protect program command S-PB3 compares the calculated check value with a reference value of a reference control flow flag sequence.

In an alternative embodiment, it may be checked whether or not the calculated check values, for example HASH1, HASH2 are contained in a set of defined stored reference values.

In a possible embodiment of the method, the check value is formed by the protect program commands for the entire control flow protection sequence generated up to this instant.

In an alternative embodiment of the method, the check value is formed over a part of constant length of the control flow flag sequence generated up to this instant. A program command PB may be formed for example by a program command or a program command sequence in an assembler programming language.

A program command counter or program counter PC within the CPU indicates a memory address of a program memory, at which the program command being executed next is filed.

An example of an assembler program command, for example for storing a value X of a variable in a register R1, is: MOV R1, X.

The program command has a command opcode MOV and operands.

As a flag it is possible to use for example the address of the instructions and/or program commands actually introduced at the test points. It is also alternatively possible to use the program command itself or the instructions themselves and/or the parameters of the program command. If for example the address of the program counter is used, the check value may be calculated using a subroutine call since during the implementation of a subroutine call normally the actual value of the program counter is laid onto a stack of the microcontroller. If the method is applied to a program that is relocated during its execution time and so the test points at the time of generating the program have no fixed addresses, then the calculation of the addresses of the program counter may be effected relative to a fixed point, for example relative to the start or to the end of the executed program.

If the flags of the test points are determined independently of the instructions and/or program commands or the addresses thereof, associated check values may also be precalculated relatively easily at the time of development of the program. In an embodiment it is moreover possible to provide various test points with the same flag and in this way make the respective associated sequential program parts indistinguishable with regard to the described procedure.

In an embodiment of the method, in which addresses and/or program commands or instructions are used as control flow flags, determination of the check value is more complex as the concrete values change with each editing of the program or with each compilation operation by an assembler or compiler of a development tool and therefore have to be adapted.

In a possible embodiment of the method, inserted protect program commands calculate a hash value as a check value. The hash functions or the hash functions of the calculated hash values have an adequate resistance to collisions. At the same time, the hash values are selected in such a way as to ensure that collisions of check values of various test points are sufficiently rare. This makes it possible to distinguish the running-through of the test points.

In a possible embodiment of the method, a check value is calculated, which locally verifies only a part of the run-through execution path of the program. For example, a constant number of the flags last run through may be temporarily stored and the calculation of the check values may be effected merely with reference to these temporarily stored flags. During execution of the program the temporarily stored flags and/or control flow flags are then pushed like a window over the flag of the execution path of the program that has been run through up until then.

In further variants and/or exemplary embodiments, with simultaneous inclusion of the hardware and/or of the microprocessor that processes the program commands use is made for example of hardware counters, which simultaneously count the clock cycle of the microprocessor independently of the executed instructions.

In an embodiment of the method, such a hardware counter is initialized at the start of program execution and then the hardware counter during execution of the application and/or of the computer program is allowed to run freely, the actual counter content at the instants of calculation of the check values being used as a control flow flag. In an embodiment, the execution times of the various instructions and/or program commands of the microcontroller need to be constant in order to achieve reproducible counter contents of the various program runs. Furthermore, in this embodiment the computer program and/or the software may have no program parts that do not have deterministic side effects, such as for example interrupt routines or program parts that poll ports for external events. In this embodiment, it is moreover necessary for the various sequentially executed program parts and/or sections of the control flow graph of the application and/or program to possess different run times or for at least the calculation of the check values in the various sequentially executed sections and/or program parts to occur at different times with regard to the respective counter contents in order that the sequential sections and/or program parts are also distinguishable by the calculated check values and error attacks may be reliably detected.

The method carries out a direct verification of an execution path of a protected program. In this case, protection from errors in the execution of the program is linked to the data that the application and/or program is processing. The method is independent of a redundancy in the data calculated by the application and also independent of calculated intermediate results.

The method of protecting a program against control flow manipulation and of detecting an incorrect program flow of the program has in particular the advantage that protect program commands for protecting the program may also be integrated or automatically inserted retrospectively into pre-existing programs and/or applications. The control flow graph of the respective program merely has to be known. In an embodiment, for implementation of the protective measures it is therefore sufficient to insert protect program commands at the desired test points or insert a call to a suitable subroutine for calculating and verifying a check value.

In contrast to known protection mechanisms by virtue of redundancy within the stored data and/or by virtue of invariants of calculated intermediate results, a further advantage of the method is that attacks, which attempt to change the number of loop executions in order thereby to manipulate intermediate results, are also reliably detected.

A further advantage of the method is that when inserting the protect program commands various security levels are scalable and/or in the method the security requirements of the applications to be protected and/or of the program to be protected may be taken into account. Depending upon the hardware used and an error model the probability of detection of errors in a control flow of a program may be adjusted by the nature and size of the control flow flags used and of the check values as well as by the methods of calculating the check values. It is further possible to use methods that generate a sequence of irregular, randomly appearing check values, which are more difficult to manipulate by an attack than for example a loop counter.

The method is particularly suitable for protecting implementations of cryptographic algorithms against error attacks. In order to prevent current analyses and analyses of the implementation time of cryptographic algorithms, these algorithms are normally implemented in such a way that the implementation possesses neither data-dependent branches nor data-dependent implementation times. In the case of such implementations, therefore, an execution path is dependent merely upon the length of the input data and not upon a concrete value of the input data. Such algorithms therefore have a fixed execution path that is easily verifiable using the method.

The method makes it possible to ensure an application that is to be protected and a correct control flow of the program by slight changes of the software and/or of the program. The protected program is capable of automatically verifying with a high probability that all of the program parts that are necessary for and/or relevant to the correct program execution are executed in the correct order. It may moreover be ensured that the correct number of program loops are executed. The method protects a program in particular from attacks that attempt to interfere with or prevent the execution of loops, jumps or subroutine calls.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865.

The invention claimed is:

1. A method of protecting a program against control flow manipulation, comprising:
　　defining a control flow flag sequence using more than two checkpoints inserted randomly into the program;
　　inserting protect program commands for generating and checking the control flow flag sequence into at least one program command sequence of program commands of the program;
　　forming a control flow flag of the control flow flag sequence by a command address of a program command;
　　calculating a check value in a protect program command as a function of the control flow flag sequence; and verifying that all loops, jumps and subroutine calls in the control flow flag sequence have been executed properly based on the check value.

2. The method as claimed in claim 1, wherein said calculating of the check value is based on a part of constant length of the control flow flag sequence generated prior to said calculating.

3. The method as claimed in claim 1, wherein said calculating of the check value is based on all of the control flow flag sequence generated prior to said calculating.

4. The method as claimed in claim 1, wherein said calculating of the check value produces a hash value.

5. The method as claimed in claim 1, further comprising comparing in a protect program command, the calculated check value with a reference value of a reference control flow sequence or whether the calculated check value is contained in a set of reference values.

6. The method as claimed in claim 5, wherein the reference value is a reference hash value.

7. An apparatus for protecting a program against control flow manipulation, comprising:
   a device automatically inserting protect program commands, generating and checking a control flow flag sequence, where the checking is dependent upon preceding checkpoints inserted randomly into the program, into at least one program command sequence of program commands of the program; and
   a device forming a control flow flag of the control flow flag sequence based on a command address of a program command, calculating a check value in a protect program command as a function of the control flow flag sequence, and verifying that all loops, jumps and subroutine calls in the control flow a sequence have been executed properly based on the check value.

8. A method of detecting incorrect program flow of a program, comprising:
   generating a control flow flag sequence, using more than two checkpoints inserted randomly into the program, during program flow of the program, a control flow flag of the control flow flag sequence being formed by a command address of a program command;
   detecting incorrect program flow if the control flow flag sequence generated does not match a stored reference control flow flag sequence or if the control flow flag sequence generated is not contained in a set of stored reference control flow flag sequences;
   calculating a check value as a function of the generated control flow flag sequence; and
   verifying that all loops, jumps and subroutine calls in the control flow flag sequence have been executed properly based on the check value.

9. The method as claimed in claim 8, wherein the check value is formed by a hash value.

10. The method as claimed in claim 8, further comprising calculating a reference value as a function of a reference control flow flag sequence.

11. The method as claimed in claim 10, wherein the reference value is formed by a reference hash value.

12. The method as claimed in claim 10, wherein said detecting of the incorrect program flow occurs if the check value calculated does not match the reference value calculated or if the check value calculated is not contained in a set of calculated reference values.

13. An apparatus for detecting incorrect program flow of a program, comprising:
   a device generating a control flow flag sequence, using more than two checkpoints inserted randomly into the program, during a program flow of the program, a control flow flag of the control flow flag sequence being formed by a command address of a program command; and
   a device detecting an incorrect program flow of the program if the control flow flag sequence generated does not match a stored reference control flow flag sequence or if the control flow flag sequence generated is not contained in a set of stored reference control flow flag sequences, calculating a check value as a function of the generated control flow flag sequence, and verifying that all loops, jumps and subroutine calls in the control flow flag sequence have been executed properly based on the check value.

14. A non-transitory computer readable medium embodying a computer program protecting against control flow manipulation, comprising:
   inserting protect program commands provided for generating and checking a control flow flag sequence using more than two checkpoints inserted randomly into the computer program, a control flow flag of the control flow flag sequence being formed by a command address of a program command, and a reference check value, calculated as a function of the control flow flag sequence, that is compared with a calculated check value to verify all loops, jumps and subroutine calls in the control flow flag sequence have been executed properly.

\* \* \* \* \*